United States Patent [19]

Gessinger

[11] 4,314,007
[45] Feb. 2, 1982

[54] COMPOSITE SHAPED ARTICLES

[75] Inventor: Gernot Gessinger, Birmenstorf, Switzerland

[73] Assignee: BBC Brown, Boveri & Company Limited, Baden, Switzerland

[21] Appl. No.: 63,818

[22] Filed: Aug. 6, 1979

Related U.S. Application Data

[62] Division of Ser. No. 826,987, Aug. 23, 1977, abandoned.

[30] Foreign Application Priority Data

Aug. 26, 1976 [CH] Switzerland .................. 10828/76

[51] Int. Cl.$^3$ .......................... B32B 15/02; F01D 5/14
[52] U.S. Cl. ................................. 428/614; 416/96 R; 416/241 R; 428/678; 428/680; 428/683; 428/685; 428/925
[58] Field of Search ............... 428/558, 614, 632, 633, 428/600, 640, 664, 665, 666, 667, 678, 685, 925; 75/232–235, 951; 416/241 R, 96; 29/156.8 B, 156.8 H

[56] References Cited

U.S. PATENT DOCUMENTS

| | | | |
|---|---|---|---|
| 2,696,662 | 12/1954 | Sech | 428/632 |
| 2,823,988 | 2/1958 | Grant et al. | 75/232 |
| 2,994,124 | 8/1961 | Denny et al. | 428/680 |
| 3,085,876 | 4/1967 | Alexander et al. | 75/232 |
| 3,087,234 | 4/1963 | Alexander et al. | 75/235 |
| 3,105,760 | 10/1963 | Grant etal. | 75/235 |
| 3,148,954 | 9/1964 | Haas | 428/686 |
| 3,179,515 | 4/1965 | Grant et al. | 75/232 |
| 3,183,396 | 5/1965 | Becker et al. | 75/233 |
| 3,231,332 | 1/1966 | Jones et al. | 75/233 |
| 3,238,025 | 3/1966 | Pendleton et al. | 428/680 |
| 3,383,235 | 5/1968 | Blackburn et al. | 428/664 |
| 3,434,810 | 3/1969 | Barnett | 75/233 |
| 3,434,811 | 3/1969 | Foldes | 75/235 |
| 3,434,812 | 3/1969 | Bondley | 75/234 |
| 3,450,512 | 6/1969 | Maxwell | 428/665 |
| 3,515,523 | 6/1970 | Galmiche et al. | 75/235 |
| 3,519,405 | 7/1970 | Gordon | 75/234 |
| 3,615,381 | 10/1971 | Hammond et al. | 75/235 |
| 3,620,693 | 11/1971 | Sama et al. | 428/640 |
| 3,622,234 | 11/1971 | Seybolt | 75/232 |
| 3,730,706 | 5/1973 | Buescher et al. | 75/235 |
| 3,764,371 | 10/1973 | Baldi | 428/600 |
| 3,773,506 | 11/1973 | Larker et al. | 416/241 |
| 3,802,851 | 4/1974 | Dunham | 75/233 |
| 3,912,552 | 10/1975 | Schultz et al. | 75/232 |
| 3,922,182 | 11/1975 | Merrick | 75/233 |
| 3,928,901 | 12/1975 | Schilling et al. | 416/241 |
| 3,979,534 | 9/1976 | Rairden | 428/640 |
| 4,036,601 | 7/1977 | Weimar et al. | 428/663 |
| 4,101,712 | 7/1978 | Bamford et al. | 29/156.8 B |
| 4,137,619 | 2/1979 | Beltran et al. | 416/241 R |
| 4,141,127 | 2/1979 | Cretella et al. | 416/241 R |

OTHER PUBLICATIONS

Sims, C. T.; "A Contemporary View of Cobolt-Base Alloys", Reprinted from *Journal of Metals*, pp. 27–42, (1969), pp. 1 and 2.

Sahm, P. R., et al.; *High Temperature Materials in Gas Turbines*, Elsevier, Amsterdam–London & N.Y., pp. 74–108, (1974).

Drennen, D. C.; *Review of Metals Technology*, Battelle, Columbus Laboratories, (1/28/72).

*Primary Examiner*—Michael L. Lewis
*Attorney, Agent, or Firm*—Oblon, Fisher, Spivak, McClelland & Maier

[57] ABSTRACT

A composite shaped article comprising at least one reinforcing core of a heat-resistant oxide-dispersion-hardened metal or alloy and a cladding of a heat-resistant metal or alloy which is compatible with the core material, the core being wholly encapsulated within and bonded to the cladding material.

A method for making the articles is provided.

22 Claims, 4 Drawing Figures

COMPOSITE SHAPED ARTICLES

This is a division of application Ser. No. 826,987, filed Aug. 23, 1977, now abandoned.

BACKGROUND OF THE INVENTION

1. Field of the Invention

The present invention relates to composite shaped articles based on high-temperature metals or alloys.

2. Description of the Prior Art

High-temperature composites are known in which reinforcing fibers, wires, rods or meshes are embedded in or clad by a heat-resistant metal or alloy. Such composites are disclosed in, for example, "High Temperature Materials in Gas Turbines" by P. R. Sahm and M. O. Speidel, Elsevier, Amsterdam-London-New York 1974; and "Turbine Blades with Thermal Fatigue Resistent Edges" by D. C. Drennen, Batelle Columbus Laboratories, Ohio, *Review of Metals Technology*, Jan. 28, 1972.

It is known to form such composites by fusion-metallurgical and powder-metallurgical processes, such as by dip-coating, continuous-casting, embedding reinforcing fibers in a powdered matrix in vacuo or by use of plasma spraying. Blanks obtained by such methods are normally compacted, for example, by sintering or extrusion, so as to reduce the cross-sectional area of the composite considerably.

An example of such a known composite is a nickel superalloy reinforced with tungsten fibers or whiskers which, although satisfactory in some respects, suffers from premature embrittlement of the tungsten fibers.

A need, therefore, continues to exist for a method of making composite articles whereby the articles so produced have improved high temperature properties, creep resistance, thermal fatigue properties, and other desirable characteristics; and where the method itself is simple and effective.

SUMMARY OF THE INVENTION

Accordingly, one object of the invention is to provide improved composites which may be prepared by a simple method.

Briefly, these and other objects of the invention as hereinafter will become more readily apparent, can be attained by providing a composite shaped article comprising at least one reinforcing core of a heat-resistant oxide-dispersion-hardened metal or alloy and a cladding of a heat-resistant metal or alloy which is compatible with the core material, the core being wholly encapsulated within and bonded to the cladding material.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
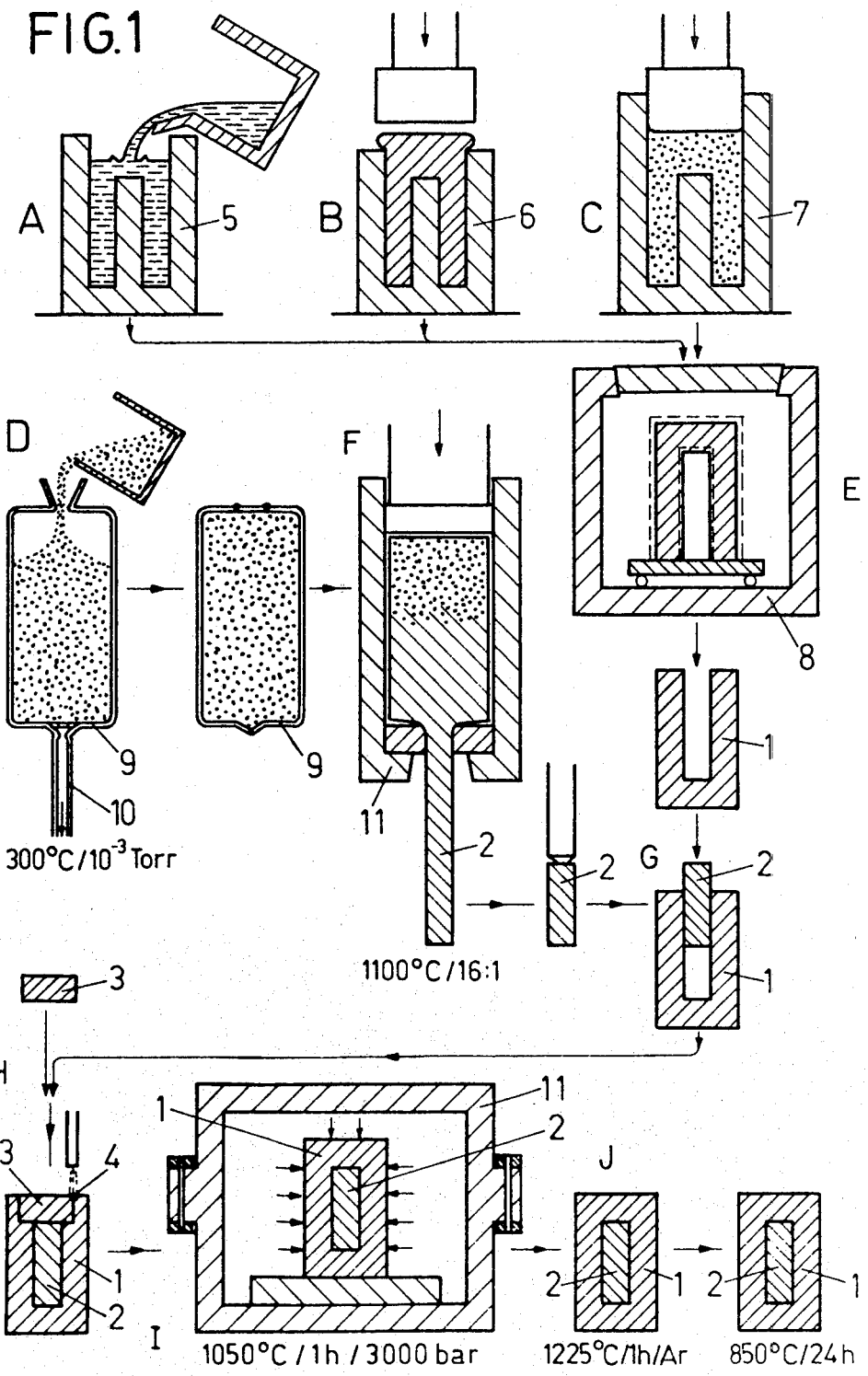
FIG. 1 is a diagrammatic representation of the various stages of a preferred form of the method according to the invention, which preferred method is described in the Example below.

A method of making the composite shaped articles of the invention comprises the following steps:

(a) shaping a heat-resistant metal or alloy so as to form a first workpiece having a cavity therein;

(b) forming a core which is shaped so as to fit snugly into the cavity;

(c) snugly fitting the core into the cavity;

(d) covering all of the core which is not contiguous to the first workpiece by means of at least one second workpiece made of the heat-resistant metal or alloy;

(e) effecting a vacuum-tight seal between each second workpiece and the first workpiece so as to produce a preform in which the core is encapsulated by the workpieces; and (f) compacting and finally shaping the preform so as to bond the core to the workpieces.

The base composition of the core material, that is, the material in which the oxide particles are dispersed, is preferably of the same alloy type as the cladding material, and preferably contains not more than 10% of the dispersing oxide. It is especially preferred that the core material and the cladding material have substantially the same composition.

Suitable cladding materials include nickel or cobalt superalloys, iron-based alloys, tungsten, tungsten alloys or molybdenum alloys.

Nickel or cobalt superalloys are alloys of nickel or cobalt with chromium and optionally cobalt or nickel, respectively, with minor constituents selected from C, W, Mo, Ta, Nb, Al, Ti, Zr and B. They are known for use in gas turbine blades.

A typical nickel superalloy has the following composition, by weight (disregarding constituents present in amounts of less than 0.005%):

| | | |
|---|---|---|
| C | 0.15 to 0.2% | (for example 0.17%) |
| Cr | 15.7 to 16.3% | (for example 16%) |
| Co | 8.0 to 9.0% | (for example 8.5%) |
| Mo | 1.5 to 2.0% | (for example 1.75%) |
| W | 2.4 to 2.8% | (for example 2.6%) |
| Ta | 1.5 to 2.0% | (for example 1.75%) |
| Nb | 0.6 to 1.1% | (for example 0.9%) |
| Al | 3.2 to 3.7% | (for example 3.4%) |
| Ti | 3.2 to 3.7% | (for example 3.4%) |
| B | 0.005 to 0.015% | (for example 0.01%) |
| Zr | 0.05 to 0.15% | (for example 0.1%) |
| Ni | balance. | |

A typical cobalt superalloy has the following composition, by weight:

| | |
|---|---|
| C | 0.6% |
| Ni | 10% |
| Cr | 23.5% |
| W | 7.0% |
| Ta | 3.5% |
| Ti | 0.2% |
| Zr | 0.5% | balance Co, incidental constituents and impurities.

When the cladding material is a cobalt superalloy, the base composition of the core material is preferably a cobalt superalloy and when the cladding material is a nickel superalloy, the base composition of the core material is preferably a nickel superalloy. Suitable oxides to be dispersed in a cobalt or nickel superalloy base composition include oxides of Y, Ca, La, Be, Th, Ce or Al, or mixtures thereof. Preferred oxides are yttrium oxide, lanthanum oxide and thorium oxide, each used in an amount of from 0.5 to 3% by weight, based on the weight of the core.

Suitable iron-based alloys for the cladding material include, for example, ferritic and austenitic heat-resistant steels of the Fe-Cr and Fe-Ni-Cr types which are known for use in the construction of heat engines.

A suitable such Fe-Ni-Cr alloy has the following composition, by weight:

| | |
|---|---|
| Cr | 15% |
| Ni | 26% |
| Mo | 1.3% |
| Al | 0.2% |
| Ti | 2% |
| C | 0.05% |
| B | 0.015% | balance Fe, incidental constituents and impurities.

Another suitable Fe-Ni-Cr alloy for use as the cladding material has the following composition, by weight:

| | |
|---|---|
| C | y % (where y is from 0.08 to 0.015) |
| Ti | 5y to 1% |
| Si | up to 0.8% |
| Mn | up to 1.0% |
| P | up to about 0.01% |
| S | up to about 0.01% |
| Cr | 15.5 to 18% |
| Ni | 13 to 16% |
| Mo | up to 0.5% |
| W | 2.5 to 4.0% |
| Fe | balance. |

A suitable Fe-Cr alloy for use as the cladding material has the following composition, by weight:

| | |
|---|---|
| C | 0.17 to 0.23% |
| Si | 0.10 to 0.50% |
| Mn | 0.3 to 0.8% |
| P | up to 0.035% |
| S | up to 0.035% |
| Cr | 11.0 to 12.5% |
| Ni | 0.3 to 0.8% |
| Mo | 0.8 to 1.2% |
| V | 0.25 to 0.35% |
| W | up to 0.6% |
| Nb | up to 0.05% |
| Fe | balance. |

When the cladding material is an iron-based alloy, the base composition of the core material is preferably an iron-based alloy such as an iron-chromium or an iron-nickel-chromium alloy as mentioned above for the cladding material.

Suitable iron-chromium or iron-nickel-chromium alloys for use as the base composition for the core material are Alloys A and B, respectively, which have the following compositions, by weight:

Alloy A:

| | |
|---|---|
| Cr | 13% |
| Mo | 2% |
| Ti | 3.5% |
| $Y_2O_3$ | 1–2% | balance Fe, incidental constituents and impurities; and

Alloy B:

| | |
|---|---|
| Cr | 17% |
| Ni | 13% |
| Mo | 0.5% |
| W | 3% |
| $Y_2O_3$ | 1–2% | balance Fe, incidental constituents and impurities.

Suitable oxides to be dispersed in the iron-based alloy include oxides of Y, Ca, La, Be, Th, Ce, Al, Ti or Cr. Particularly when the base composition is a ferritic steel alloyed with chromium, it is especially advantageous to use titanium dioxide ($TiO_2$), or chromium oxide ($Cr_2O_3$), each in an amount of from 0.5 to 5% by weight, or yttrium oxide ($Y_2O_3$) in an amount of from 1 to 2% by weight.

Yttrium oxide is the preferred oxide for the above-mentioned Alloys A and B, particularly when it is used in an amount of about 1.5% by weight, based on the weight of the core.

The above-mentioned dispersion-hardened chromium-containing iron alloys have high mechanical damping and high creep resistance in the temperature range from 600° to 700° C.

When the cladding material is a tungsten alloy, it preferably contains up to 40% by weight of molybdenum.

A suitable molybdenum alloy for the cladding material has the following composition, by weight:

| | |
|---|---|
| Ti | 0.5% |
| Zr | 0.07% |
| C | 0.01% | balance Mo, incidental constituents and impurities.

When the cladding is formed of tungsten, a tungsten alloy or a molybdenum alloy, the base composition of the core material is preferably of similar composition. Suitable oxides to be dispersed in such a core include yttrium oxide, lanthanum oxide and thorium oxide.

Articles according to the invention having a tungsten, tungsten alloy or molybdenum alloy cladding and an oxide-dispersion-hardened tungsten, tungsten alloy or molybdenum alloy core are not particularly useful in heat engines because of their high affinity for oxygen and their low corrosion resistance at high temperatures. However, they are very useful for electrodes and grids for electron tubes and gas-discharge tubes.

It is especially advantageous in certain cases to use precisely the same metal or alloy composition as the base material for the core and as the cladding material. The composition of the core material would then differ from that of the cladding material only in that it would further contain up to 10% by weight of dispersed oxides. Suitable such oxides include oxides of the elements Y, Ca, La, Be, Th, Ce, Al, Ti, Zr, and mixtures thereof.

The ratio between the cross-sectional area of the core(s) and the cross-sectional area of the cladding is preferably from 0.05 to 2:1. At the lower end of this range, the cladding forms just a thin-walled coating on the core, while at the higher end of the range, the cladding forms the bulk of the cross-section.

The core may have a cross-section of circular, elliptical, square, rectangular or airfoil profile shape, and may be in the form of a cylinder, prism, coil, cone, spiral or a wound flat bar. Circular cross-sections are particularly advantageous.

The composite articles according to the invention have better high-temperature properties than the cladding material. In particular, the use of a dispersion-hardened core according to the invention results in the articles having improved creep-resistance and spalling-resistance at high temperatures, without the danger of embrittlement caused by chemical reaction between a reinforcement, such as tungsten whiskers, and a matrix incompatible therewith, such as a nickel superalloy.

In the case of a nickel superalloy-based composite article according to the invention, the creep-resistance of the superalloy can be increased by a value corresponding to the cross-sectional ratio of core:cladding. The creep-resistance of the article may accordingly be higher than that of the cladding by 70% of the difference between the creep-resistance of the cladding and that of the core.

Peak stresses which arise in operation at the interface between core and cladding are minimized by means of the present invention which provides for a rigid core to be associated with a relatively more ductile cladding. This arrangement also provides good thermal fatigue properties.

In the method according to the invention, step (a), which forms a part of the cladding, may be preformed by suitable conventional methods, including forging, casting (particularly precision-casting), or powder pressing or consolidation, followed by sintering. Expensive methods can be avoided.

A plurality of cavities may be formed in step (a), when a final article having a plurality of cores is to be produced, a core being fitted into each cavity in step (c). Depending on the intended use of the shaped article, cooling channels may also be formed in step (a).

Step (b), which forms one or more cores, is advantageously performed by a powder metallurgical process, with hot or cold working.

Step (d) is advantageously performed using a small plug for each second workpiece, which is preferably of the same material as the first workpiece, but which may be of a similar composition provided that it can be bonded to the first workpiece by a vacuum-tight seal in step (e).

Step (e) may be performed by suitable techniques including electron beam welding, laser beam welding, argon arc welding or submerged arc welding in vacuo.

Step (f) is preferably performed by shaping to the final desired shape at an elevated temperature so as to form a monolithic composite article in which all the pores in the starting material have been closed. Suitable such techniques include hot forging, hot rolling, hot extrusion, hot drawing or isostatic hot pressing.

After step (f), the article is preferably subjected to further heat-treatment to effect grain growth, for example, in an inert atmosphere, such as argon, at a temperature in the range of 1200° to 1250° C. for ½ hour to 2 hours, and precipitation-hardening, for example, at a temperature of 800° to 900° C. for up to 24 hours.

In order that the invention may be more fully understood, the following Example, in which all percentages are by weight, is given by way of illustration only, and is not intended to be limiting unless otherwise specified.

EXAMPLE

The steps illustrated schematically in FIG. 1 were employed.

A cladding 1 was prepared by one of casting, especially precision-casting (A) a suitable alloy such as IN-738 into a mold 5, forging a suitable alloy (B) in a die 6, or pressing (C) a suitable powdered alloy in a mold 7 and then sintering (E) in a furnace 8.

IN-738 is a nickel superalloy having the following composition:

| | |
|---|---|
| C | 0.17% |
| Cr | 16% |
| Co | 8.5% |
| Mo | 1.75% |
| W | 2.6% |
| Ta | 1.75% |
| Nb | 0.9% |
| Al | 3.4% |
| Ti | 3.4% |
| B | 0.01% |
| Zr | 0.1% |
| Ni | balance. |

A core 2 was made as follows:

Master alloys Ni 15 Ti 15 Al and Ni 29 Zr were first cast in vacuo as round bars and comminuted in an argon atmosphere to powder of particle size 200 microns by the rotating electrode process. The powder was ground to a particle size of 8 microns in a ball mill for 12 hours and then mixed with powdered yttrium oxide and powdered elements to give a mixture of the following composition:

| | |
|---|---|
| Cr | 16% |
| Co | 8.5% |
| Mo | 1.75% |
| W | 2.6% |
| Ta | 1.75% |
| Nb | 0.9% |
| Ni15Ti15Al | 22.7% |
| Ni 29 Zr | 0.25% |
| $Y_2O_3$ | 1.5% |
| Ni | 44% |

A carbon steel capsule (0.35% C) of 3 mm wall thickness 9 was filled with 1120 grams of the powder mixture, which was heated (D) under a dynamic vacuum of $10^{-3}$ mm Hg to 300° C. For this purpose, the capsule 9 was provided with a small diameter evacuation tube which was sealed vacuum-tight by pinching off and welding up after the evacuation.

The capsule filled with powder was heated for 2 hours, brought to a pressing temperature of 1100° C. and compacted (F) in an extruding press 11 of diameter 54 mm under a ram pressure of 818 N/mm² at a cross-sectional reduction ratio of 1:16 to give an extruded strand 2.

A piece of the strand was cut to length and fitted snugly in the cavity of the cladding prepared above (G).

The remaining recess in the article was covered by a small plate 3 of IN-738 and the cover was welded to the rest of the cladding by an electron beam process (H), so as to form a vacuum-tight seal 4.

The resulting article was compacted by isostatic hot pressing (I) in a press 11 at a pressure of 3000 bars in an argon atmosphere at a temperature of 1050° C. for 1 hour, whereby the core 2 and the cladding 1 were welded together to form a monolithic body and all the pores were closed.

The article was heat-treated (J) to effect grain-growth at 1225° C. in argon for one hour, cooled in air and then further heat-treated to effect precipitation-hardening at 850° C. for 24 hours.

Figure 2:
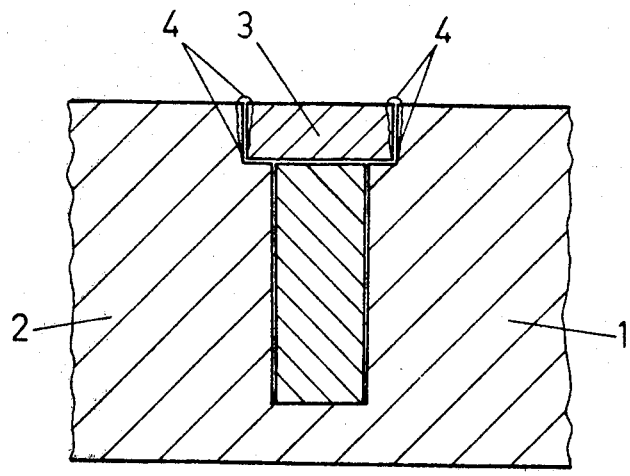
FIG. 2 is a sectional elevation, on a larger scale, of the shaped article made by the method illustrated in FIG. 1.

The article so produced is shown in greater detail in the sectional elevation of FIG. 2.

Figure 3:
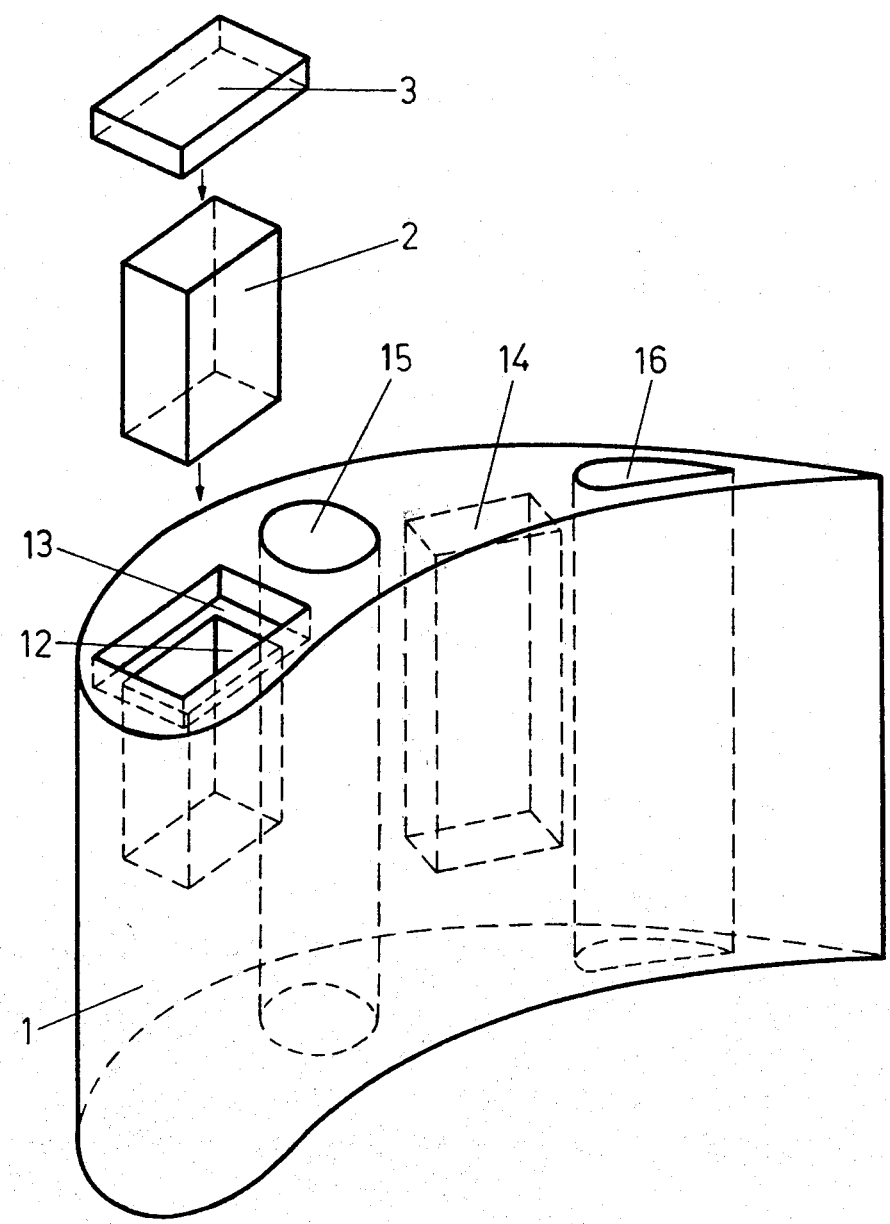
FIG. 3 is a partly exploded perspective view of a composite article according to the invention, which is a gas turbine blade.

Alternative shapes for articles produced according to the invention are illustrated in FIGS. 3 and 4.

FIG. 3 shows a composite article which comprises a precision-cast cladding 1 in the form of an airfoil having two prismatic reinforcing cores 14 and 2 and two cooling channels 15 and 16. The manner in which the reinforcing cores are sealed in the airfoil is shown for core 2 in a partly exploded view, in which it can be seen that the core 2 fits in a cavity 12 having a recess 13 at the end thereof to which a small cover plate 3 is fixed. The cover is sealed in a vacuum-tight manner to the cladding 1, and the cladding 1 and the cover plate 3 are bonded to the core 2.

Figure 4A:
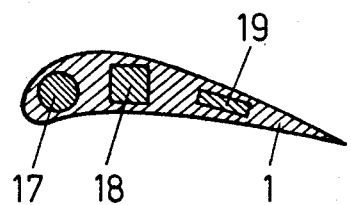
FIG. 4 shows, in cross-section, three further composite gas turbine blades according to the invention.
Figure 4B:
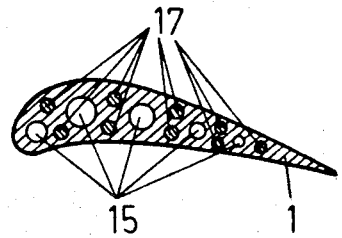
Figure 4C:
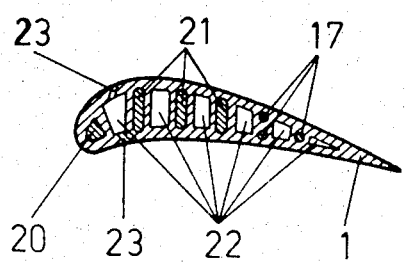

FIGS. 4a, 4b and 4c show other cross-sectional shapes for a turbine blade according to the invention.

In FIG. 4a is shown a blade 1 having a core 17 of circular section at its leading edge, a core 18 of square section at a central portion and a core 19 of rectangular section at a trailing edge, the blade having no cooling channels.

In FIG. 4b is shown a blade 1 having a plurality of circular-sectioned cooling channels 15 and a plurality of circular-sectioned reinforcing cores 17.

In FIG. 4c is shown a blade 1 having a grid-like cross-section with a plurality of cooling channels 22 and reinforcing cores of circular section 17, paraboloid section 20 and substantially rectangular section but with two opposing sides curved outwardly 21. The cooling channel nearest the leading edge has an orifice through which coolant can flow to form, in use, a heat-insulating boundary downstream. Such a blade is suitable for most stringent requirements, such as for airplane jet engines.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A turbine blade which comprises a plurality of reinforcing cores of a heat resistant, oxide dispersion hardened alloy and a cladding of a heat resistant alloy which is compatible with said core material, said reinforcing cores each being individually wholly encapsulated and bonded to said cladding material wherein the ratio of cross-sectional area of said cores and said cladding area is from 0.05 to 2:1.

2. The turbine blade of claim 1, wherein the base composition of said cladding material is a nickel superalloy.

3. The turbine blade of claim 2, wherein said nickel superalloy has the following composition by weight (disregarding constituents present in amounts of less than 0.005%):

| C | 0.15 to 0.2% |
|---|---|
| Cr | 15.7 to 16.3% |
| Co | 8.0 to 9.0% |
| Mo | 1.5 to 2.0% |
| W | 2.4 to 2.8% |
| Ta | 1.5 to 2.0% |
| Nb | 0.6 to 1.1% |
| Al | 3.2 to 3.7% |
| Ti | 3.2 to 3.7% |
| B | 0.005 to 0.015% |
| Zr | 0.05 to 0.15% |
| Ni | balance. |

4. The turbine blade of claim 1, wherein the base composition of said cladding material is a cobalt superalloy.

5. The turbine blade of claim 4, wherein said cobalt superalloy has the following composition, by weight:

| C | 0.6% |
|---|---|
| Ni | 10.0% |
| Cr | 23.5% |
| W | 7.0% |
| Ta | 3.5% |
| Ti | 0.2% |
| Zr | 0.5% | balance Co, incidental constituents and impurities.

6. The turbine blade of claim 1, wherein the base composition of said cladding material is an iron-based alloy.

7. The turbine blade of claim 6, wherein said iron-based alloy has the following composition, by weight:

| Cr | 15% |
|---|---|
| Ni | 26% |
| Mo | 1.3% |
| Al | 0.2% |
| Ti | 2% |
| C | 0.05% |
| B | 0.015% | balance Fe, incidental constituents and impurities.

8. An turbine blade according to claim 6, wherein said iron-based alloy has the following composition, by weight:

| C | 0.17 to 0.23% |
|---|---|
| Si | 0.10 to 0.50% |
| Mn | 0.3 to 0.8% |
| P | up to 0.035% |
| S | up to 0.035% |
| Cr | 11.0 to 12.5% |
| Ni | 0.3 to 0.8% |
| Mo | 0.8 to 1.2% |
| V | 0.25 to 0.35% |
| W | up to 0.6% |
| Nb | up to 0.05% |
| Fe | balance. |

9. The turbine blade of claim 6, wherein said iron-based alloy has the following composition, by weight:

| C | y %, where y is from 0.08 to 0.15 |
|---|---|
| Ti | 5y to 1% |
| Si | up to 0.8% |
| Mn | up to 1.0% |
| P | up to about 0.01% |
| S | up to about 0.01% |
| Cr | 15.5 to 18.0% |

| | |
|---|---|
| Ni | 13.0 to 16.0% |
| Mo | up to 0.5% |
| W | 2.5 to 4.0% |
| Fe | balance. |

10. The turbine blade of claim 1, wherein the base composition of said cores is a nickel alloy, which has dispersed therein at least one oxide selected from the group consisting of the oxides of the elements Y, Ca, La, Be, Th, Ce, and Al.

11. The turbine blade of claim 14, wherein said oxide comprises from 0.5 to 3% by weight of at least one of yttrium oxide, lanthanum oxide or thorium oxide.

12. The turbine blade of claim 1, wherein the base composition of said cores is a cobalt alloy, which has dispersed therein at least one oxide selected from the group consisting of the oxides of the elements Y, Ca, La, Be, Th, Ce, and Al.

13. The turbine blade of claim 12, wherein said oxide comprises from 0.5 to 3% by weight of at least one of yttrium oxide, lanthanum oxide, or thorium oxide.

14. The turbine blade of claim 1, wherein the base composition of said cores is an iron-based alloy, which has dispersed therein at least one oxide selected from the group consisting of the oxides of the elements Y, Ca, La, Be, Th, Ce, Al, Ti, and Cr.

15. The turbine blade of claim 14, wherein said iron-based alloy is an iron-chromium alloy having the following composition, by weight:

| | |
|---|---|
| Cr | 13% |
| Mo | 2% |
| Ti | 3.5% |
| $Y_2O_3$ | 1.5% | balance Fe, incidental constituents and impurities.

16. The turbine blade of claim 14, wherein said iron-based alloy is an iron-chromium alloy which additionally contains from 0.5 to 5% by weight titanium dioxide ($TiO_2$).

17. The turbine blade of claim 14, wherein said iron-based alloy is an iron-chromium alloy which additionally contains from 0.5 to 5% by weight chromic oxide ($Cr_2O_3$).

18. The turbine blade of claim 14, wherein said iron-based alloy is an iron-nickel-chromium alloy having the following composition, by weight:

| | |
|---|---|
| Cr | 17% |
| Ni | 13% |
| Mo | 0.5% |
| W | 3% |
| $Y_2O_3$ | 1.5% | balance Fe, incidental constituents and impurities.

19. The turbine blade of claim 1, wherein the base composition of said cores is a tungsten alloy, which has dispersed therein at least one oxide selected from the group consisting of the oxides of the elements Y, La, and Th.

20. The turbine blade of claim 1, wherein the base composition of said cores is a molybdenum alloy, which has dispersed therein at least one oxide selected from the group consisting of the oxides of the elements La, Y, and Th.

21. The turbine blade of claim 1, wherein the base composition of said cores is the same as the base composition of said cladding material; and wherein the composition of said cores differ from the composition of said cladding material only in that said base composition of said cores has dispersed therein at least one oxide selected from the group consisting of the oxides of the elements Y, Ca, La, Be, Th, Ce, Al, Ti, and Zr.

22. The turbine blade of claim 21, wherein the total amount of said dispersed oxides is no more than 10% by weight.

* * * * *